(12) United States Patent
Kato et al.

(10) Patent No.: US 9,598,059 B2
(45) Date of Patent: Mar. 21, 2017

(54) CONTROL APPARATUS FOR VEHICLE

(71) Applicant: TOYOTA JIDOSHA KABUSHIKI KAISHA, Toyota-shi, Aichi-ken (JP)

(72) Inventors: Hirokazu Kato, Nisshin (JP); Hiroaki Seguchi, Toyota (JP); Jumpei Kakehi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/032,087

(22) PCT Filed: Nov. 10, 2014

(86) PCT No.: PCT/IB2014/002387
§ 371 (c)(1),
(2) Date: Apr. 26, 2016

(87) PCT Pub. No.: WO2015/068024
PCT Pub. Date: May 14, 2015

(65) Prior Publication Data
US 2016/0257287 A1  Sep. 8, 2016

(30) Foreign Application Priority Data

Nov. 11, 2013  (JP) .................................. 2013-233339

(51) Int. Cl.
*B60T 7/12* (2006.01)
*B60W 10/06* (2006.01)
(Continued)

(52) U.S. Cl.
CPC .............. *B60T 7/12* (2013.01); *B60W 10/06* (2013.01); *B60W 10/182* (2013.01);
(Continued)

(58) Field of Classification Search
CPC ....... B60T 7/12; B60W 10/06; B60W 10/182; B60W 10/184; B60W 30/18063;
(Continued)

(56) References Cited

U.S. PATENT DOCUMENTS

2010/0174473 A1   7/2010  Pursifull et al.
2010/0198449 A1*  8/2010  Ueoka ................. B60L 15/2009
                                                701/31.4

FOREIGN PATENT DOCUMENTS

JP   2000-313253 A   11/2000
JP   2013-071472 A    4/2013
JP   2013-132933 A    7/2013

* cited by examiner

*Primary Examiner* — Rodney Butler
(74) *Attorney, Agent, or Firm* — Oliff PLC (57) ABSTRACT

A controller for a vehicle includes: an engine controller that outputs a stop request to stop an engine when a stop condition is satisfied, and that outputs a start request to start the engine or resume the engine from a stop preparation state when a start condition is satisfied; a brake controller that, at least in a period between the outputs of the requests by the engine controlling part, automatically generates a braking force for keeping parking regardless of a driver's brake operation and that in a case where an accelerator operation amount is smaller than a predetermined ratio, when the start request has been output and the engine is being resumed from the stop preparation state to a normal rotation state, the brake controller reduces a brake pressure to a first predetermined pressure in a shorter time than when the engine is being started from a stopped state.

5 Claims, 6 Drawing Sheets (51) Int. Cl.
  *B60W 10/18*    (2012.01)
  *B60W 30/18*    (2012.01)
  *B60W 30/19*    (2012.01)
  *B60W 10/184*   (2012.01)
  *B60W 30/192*   (2012.01)

(52) U.S. Cl.
  CPC .... *B60W 10/184* (2013.01); *B60W 30/18027* (2013.01); *B60W 30/18063* (2013.01); *B60W 30/18118* (2013.01); *B60W 30/192* (2013.01); *B60W 2540/12* (2013.01)

(58) Field of Classification Search
  CPC ......... B60W 30/18118; B60W 30/192; B60W 30/18027; B60W 2540/12
  See application file for complete search history.

CONTROL APPARATUS FOR VEHICLE

BACKGROUND OF THE INVENTION

1. Field of the Invention

The invention relates to a control apparatus for a vehicle having an idling stop function.

2. Description of Related Art

There is a technology in which in a vehicle having an idling stop function, in order to prevent rushing out upon the start of the engine (a state in which the vehicle suddenly rushes out forward due to a creeping force by driving of the engine after start-up), the brake pressure is maintained even after the engine has been started, and is gradually reduced (see Japanese Patent Application Publication No. 2013-071472 (JP 2013-071472 A), for example).

Even in the case where a stop request is output to the engine because an engine stop condition for idling stop is satisfied, depending on the condition at the engine side or the like, the engine may occasionally be in a stop preparation state at which the rotation of the engine continues. For example, in the case where the fuel vapor accumulated in a canister is required to be removed (purged) via a path in communication with an air intake system of the engine and the timing therefor is overlapped with the timing at which the engine is required to be stopped, the engine will not be stopped immediately.

For example, if the parking time is short, such as, when the vehicle is temporarily stopped and will be started soon, a stop request is output to the engine due to the temporary stop, and an engine start request is output immediately after the engine becomes to the stop preparation state. Therefore, the engine may occasionally resume to a normal rotation state from the stop preparation state. In this case, for example, in the technology as disclosed in JP 2013-071472 A, the brake pressure will also be maintained according to the engine start request, and is gradually reduced.

SUMMARY OF THE INVENTION

However, in the case where the engine is resumed to the normal rotation state from the stop preparation state, the engine continues rotating. Therefore, if the brake pressure is maintained as in JP 2013-071472 A, the vehicle will not start immediately even after the press on the brake is released. Accordingly, the driver may feel a discomfort as if the creeping force disappears.

The invention provides a control apparatus for a vehicle that can not only suppress the rushing out at the start of the engine but also alleviate the driver's discomfort due to the maintaining of the brake pressure in the case where the engine is resumed to the normal rotation state from the stop preparation state.

In order to achieve the above object, in an embodiment, a control apparatus for a vehicle is characterized by including: an engine controlling part that stops an engine by outputting a stop request to the engine if a predetermined engine stop condition is satisfied, and that starts the stopped engine or resumes the engine which is performing a stop preparation and is still rotating to a normal rotation state, by outputting a start request to the engine if a predetermined engine start condition is satisfied after the stop request has been output; a brake controlling part that, at least in a period from the output of the stop request to the output of the start request by the engine controlling part, automatically generates a braking force for keeping parking of the vehicle, regardless of a driver's brake operation; and a creep driving force generating part that generates a creep driving force by driving of the engine, wherein in the case where an accelerator operation amount is smaller than a predetermined ratio, when the start request has been output and the engine is being resumed to the normal rotation state from a state in which the stop preparation is being performed, the brake controlling part reduces a brake pressure to a first predetermined pressure in a shorter time than that when the start request has been output and the engine is being started from a stopped state.

According to the present embodiment, it is possible to provide a control apparatus for a vehicle that can not only suppress rushing out at the start of the engine but also alleviate the driver's discomfort due to the maintaining of the brake pressure in the case where the engine is resumed to the normal rotation state from the stop preparation state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the attached drawings.

Figure 1:
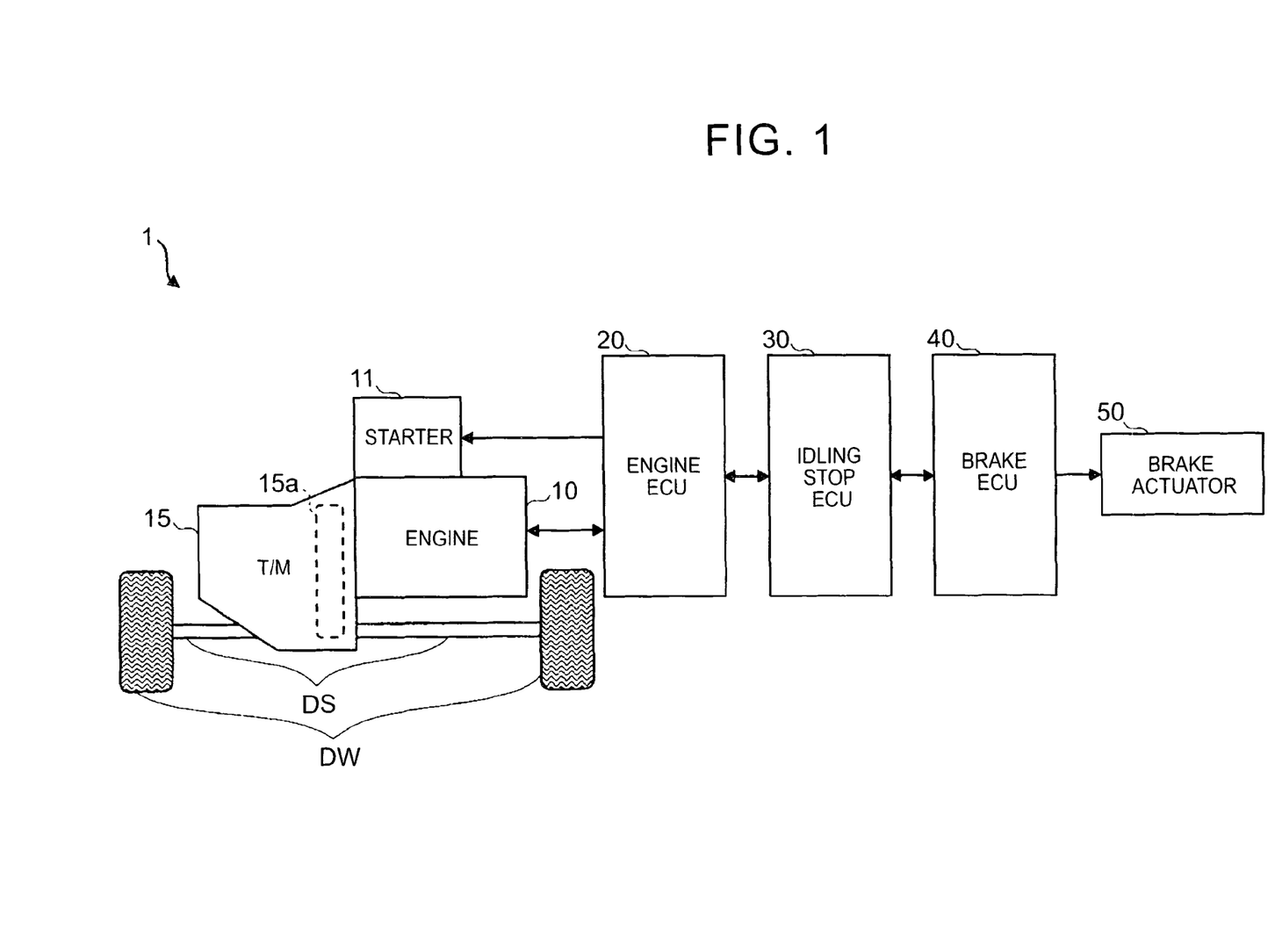
FIG. 1 is a block view showing an example of the configuration of a vehicle including a vehicular control apparatus.

FIG. 1 is a block view showing the configuration of a vehicle including a vehicular control apparatus 1 according to the present embodiment.

The vehicle is equipped with an engine 10 as a driving source. The power of the engine 10 is transmitted to driving wheels DW through an automatic transmission 15 capable of being shifted to a predetermined gear, a differential (not shown) and a drive shaft DS, and thus the vehicle travels.

In addition, a torque converter 15a is provided between the engine 10 and the automatic transmission 15 so as to be built in a housing of the automatic transmission 15. With the torque converter 15a, even in an OFF state of an accelerator, the driving force of the engine 10 may be transmitted as a creep driving force to the driving wheels, so the vehicle launches slowly.

The engine 10 is started by a starter 11, which is driven by an electric power from a battery (not shown). In addition, "start" as used herein includes an engine start based on a normal operation of an ignition switch and an engine start after an engine stop based on an idling stop function.

The vehicular control apparatus 1 according to the present embodiment performs a control (an idling stop control) to stop the engine and to start the engine after it is stopped based on the idling stop function of the vehicle. In addition, a control (an automatic brake control) to automatically generate a braking force regardless of a driver's operation is also performed, so as to prevent sliding down of the vehicle and/or rushing out of the vehicle at the start-up of the engine.

The vehicular control apparatus 1 may include an engine ECU 20, an idling stop ECU 30, a brake ECU 40, and a brake actuator 50, and so on.

The engine ECU 20, the idling stop ECU 30 and the brake ECU 40 each are made up of a microcomputer which has, for example, a CPU for carrying out operation processes, a ROM for storing control programs, a readable and rewritable RAM for storing operation results and so on, a timer, a counter, an input/output interface, or the like. In addition, the functions of the engine ECU 20, the idling stop ECU 30 and the brake ECU 40 can also be implemented by any hardware, software, firmware and a combination thereof. For example, a part of or all the functions of the engine ECU 20, the idling stop ECU 30 and the brake ECU 40 can be implemented by an ASIC (Application-Specific Integrated Circuit) for special use or an FPGA (Field Programmable Gate Array). In addition, a part of or all the functions of the engine ECU 20, the idling stop ECU 30 and the brake ECU 40 can also be implemented by other ECUs. In addition, the engine ECU 20, the idling stop ECU 30 and the brake ECU 40 may also be used to implement a part of or all the functions of other ECUs. For example, a part of or all the functions of the idling stop ECU 30 can be implemented either by the engine ECU 20, or by the brake ECU 40.

The engine ECU 20 is an electronic control unit for controlling the engine 10. The engine ECU 20 controls fuel injectors (fuel injection timing, fuel injection amount, and so on), sparking plugs (ignition timing, and so on), intake and exhaust valves (opening and closing timing) of the engine 10, based on an accelerator operation amount, a vehicle speed, a crank angle, a cam angle, an engine speed, and so on. In addition, the engine ECU 20 may obtain the accelerator operation amount by receiving signals output from an accelerator operation amount sensor (not shown) provided at an accelerator operation pedal. In addition, the engine ECU 20 may obtain the vehicle speed by receiving signals output from a vehicle speed sensor (not shown). In addition, the engine ECU 20 may obtain the crank angle and/or the engine speed by receiving signals output from a crank angle sensor (not shown) in the engine 10. In addition, the engine ECU 20 may obtain the cam angle by receiving signals from a cam angle sensor (not shown).

In addition, the engine ECU 20 controls a relay (not shown) provided in a power supply path from the battery to the starter 11 to drive the starter 11 so as to start the engine 10. For example, when the driver turns on the ignition switch (IG switch), the ON signal is input into the engine ECU 20, and the engine ECU 20 starts the engine 10 by energizing the relay.

In addition, the engine ECU 20 receives an engine stop request output from the idling stop ECU 30, which will be described in detail below, and according to the engine stop request, cuts off the fuel supply so as to stop the engine 10. In addition, the engine ECU 20 receives an engine start request output from the idling stop ECU 30, and according to the engine start request, drives the starter 11 by controlling the above-mentioned relay, so as to start the engine 10.

In this way, the engine ECU 20 may perform the control of engine stop or engine start in the idling stop operation.

The idling stop ECU 30 is an electronic control unit for performing the idling stop control of the vehicle. The idling stop ECU 30 determines whether or not a predetermined engine stop condition is satisfied, and if the predetermined engine stop condition is satisfied, outputs the engine stop request to the engine ECU 20. For example, the idling stop ECU 30 may determine that the predetermined engine stop condition is satisfied if a detected master cylinder pressure (hereinafter, referred to as MC pressure) is a predetermined press pressure or more (a press of a predetermined value or more is applied on the brake). In addition, the idling stop ECU 30 determines whether or not a predetermined engine start condition is satisfied, and if the predetermined engine start condition is satisfied, outputs the engine start request to the engine ECU 20. For example, the idling stop ECU 30 may determine that the predetermined engine start condition is satisfied if the detected MC pressure is a predetermined release pressure or less (the press on the brake is released).

Furthermore, the engine stop condition and the engine start condition may include, for example, conditions in associated with a speed of the engine 10, a temperature of a coolant, a current, a voltage and a temperature of the battery, the vehicle speed, the MC pressure, the state of a door courtesy switch, or the like. For example, the engine stop condition may include a condition that an estimated SOC (state of charge) calculated from the current and the voltage of the battery is larger than or equal to a predetermined ratio. In addition, the engine start condition may include a condition that the door courtesy switch is ON (the door is closed). In addition, the idling stop ECU 30 may obtain an information about the speed of the engine 10 and/or the temperature of the coolant by receiving signals output from the engine ECU 20, and may also obtain the information by directly receiving signals output from corresponding sensors. In addition, the idling stop ECU 30 may obtain an information about the voltage, the current and the temperature of the battery by receiving signals output from a battery ECU (not shown), and may also obtain the information by directly receiving signals output from corresponding sensors provided in the battery. In addition, the idling stop ECU 30 may obtain the vehicle speed by receiving signals output from the vehicle speed sensor (not shown). In addition, the idling stop ECU 30 may obtain an information about the MC pressure by receiving signals output from the brake ECU 40, or may also obtain the information by directly receiving signals output from a MC pressure sensor (not shown). In addition, the idling stop ECU 30 may obtain an information about the door courtesy switch (not shown) by receiving signals output from a body ECU (not shown), and may also obtain the information by directly receiving signals output from the door courtesy switch.

In addition, the idling stop ECU 30 outputs a brake maintain request and a brake release request to the brake ECU 40 according to the above engine stop request and engine start request. More specifically, in the case where the engine stop request is output to the engine ECU 20, basically, the engine 10 is stopped. Then, the brake maintain request is output to the brake ECU 40, and a braking force (a brake pressure) is generated via the brake ECU 40, so that the vehicle is prevented from inadvertently moving due to a slope etc. while the engine 10 is stopped. That is, in order to prevent the vehicle from sliding down, the idling stop ECU 30 outputs the brake maintain request together with the engine stop request. In addition, in the case where the engine start request is output to the engine ECU 20, basically, the engine 10 is started. Therefore, the brake release request is output to the brake ECU 40, and the brake pressure is reduced (the braking force is reduced) via the brake ECU 40, so as to enable the vehicle to travel. That is, the idling stop ECU 30 outputs the brake release request together with the engine start request, so as to allow the vehicle to travel.

The brake ECU 40 is an electronic control unit for performing a brake control of the vehicle. For example, a control on the brake actuator 50 for operating hydraulic brake devices provided at the respective wheels is performed.

The brake ECU 40 controls an output (a pressure of wheel cylinders) of the brake actuator 50 according to the brake maintain request or the brake release request received from the idling stop ECU 30. Moreover, the brake ECU 40 performs a brake maintaining after the engine stop request or a brake releasing after the engine start request (the automatic brake control). That is, at least in a period from the output of the engine stop request to the output of the engine start request by the engine ECU 20, a braking force for keeping parking of the vehicle is automatically generated, regardless of the driver's brake operation. Specifically, for example, a wheel cylinder pressure corresponding to a braking force capable of keeping a stopped state of vehicle can be automatically generated in accordance with the brake maintain request from the idling stop ECU 30 and an information about the MC pressure. More specifically, for example, a wheel cylinder pressure corresponding to the maximum value of the MC pressure based on the driver's brake operation immediately before the engine is stopped can be generated automatically (a peak maintain control). Thereby, the maximum braking force immediately before the vehicle is stopped can be generated, and thus the stopped state of the vehicle can be maintained. In addition, according to the brake release request from the idling stop ECU 30, the wheel cylinder pressure is reduced within a predetermined time in a predetermined pressure reduction pattern. For example, if the wheel cylinder pressure is suddenly reduced, there is a possibility that the vehicle will rush out due to the creep driving force corresponding to the torque of the engine after the engine is started. Therefore, at the start-up of the engine, the wheel cylinder pressure may be reduced in such a predetermined pressure reduction pattern that the vehicle will not rush out. The details about the method for reducing the wheel cylinder pressure corresponding to the brake release request will be described below.

The brake actuator 50 may include a pump for generating a high pressure oil (and a motor for driving the pump), various valves, a hydraulic circuit, and so on. In addition, the hydraulic circuit may have any configuration, as long as the wheel cylinder pressure can be increased independent of the press amount of a brake pedal by the driver. Typically, it would be enough if a high pressure source (a pump for generating the high pressure oil and/or an accumulator) is included in addition to the master cylinder. In addition, a circuit configuration which is typically used in a brake by wire system represented by ECB (Electric Control Braking system) may be employed.

Next, taking a situation in which the accelerator is OFF (the driving force generated by operation of the accelerator may be neglected) as an example, the brake release (reduction of the brake pressure) operation performed by the brake ECU 40 at the start-up of the engine 10 will be described. In addition, given that the brake pedal is released by the driver and the MC pressure is reduced to a predetermined release pressure or less at the start-up of the engine 10. In addition, hereinafter, the wheel cylinder pressure will also be referred to as brake pressure.

Figure 2:
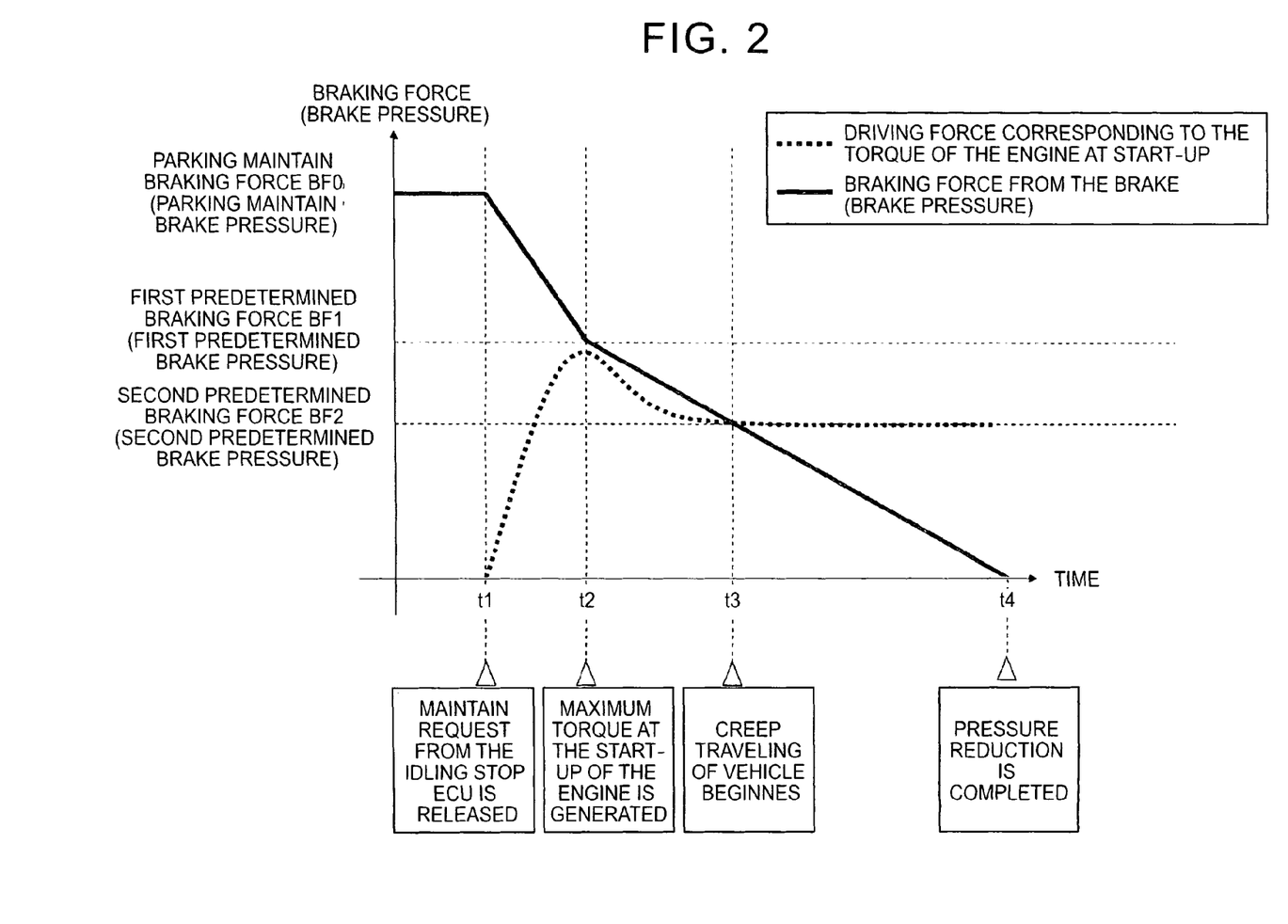
FIG. 2 is a view showing the operation of the vehicular control apparatus (a brake ECU) in the case of being started from an engine stop state.

FIG. 2 is a view showing the operation of the vehicular control apparatus 1 (the brake ECU 40) in the case where the engine 10 is started from a stopped state and the accelerator is OFF. The vertical axis represents the braking force (or the brake pressure), the horizontal axis represents time, and the variation of the braking force (brake pressure) with time before and after the idling stop ECU 30 outputs the brake release request is shown by solid line. In addition, the creep driving force corresponding to the torque of the engine 10 at the start-up of the engine is also shown by a dotted line. In addition, the parking maintain braking force (the parking maintain brake pressure) BF0 in this figure is a braking force (a brake pressure) for keeping the vehicle in the stopped state, which is generated by the brake ECU 40 due to the brake maintain request from the idling stop ECU 30. The parking maintain braking force (the parking maintain brake pressure) BF0 may be a braking force (a wheel cylinder pressure) determined by the above-mentioned peak maintain control. In addition, a first predetermined braking force (a first predetermined brake pressure) BF1 is preset as a braking force (a brake pressure corresponding to this braking force) larger than the creep driving force corresponding to the maximum torque of the engine 10 at the start-up of the engine 10. In addition, a second predetermined braking force (a second predetermined brake pressure) BF2 is a braking force (a brake pressure corresponding to this braking force) substantially equal to the creep driving force of the engine 10 in an idling state.

Referring to FIG. 2, till time t1, a constant parking maintain braking force BF0 corresponding to the brake maintain request from the idling stop ECU 30 is generated, thereby the vehicle is kept in the stopped state.

At time t1, the engine start request is output from the idling stop ECU 30 to the engine ECU 20, and the brake release request is output to the brake ECU 40. Accordingly, from time t1 to time t2, the brake pressure is reduced in a constant reduction rate, and the braking force is gradually reduced in a constant rate correspondingly. In addition, corresponding to the engine start request, the engine 10 is started, and the creep driving force corresponding to the torque of the engine 10 is increased while depicting a shape of convex parabola.

At time t2, the creep driving force corresponding to the torque of the engine 10 assumes a maximum value with overshoot. The braking force at this time is the first predetermined braking force BF1 larger than the maximum value. Thereby, at time t2, the braking force is larger than the creep driving force of the engine 10, and thus the vehicle is still parking.

From time t2 to time t3, the brake pressure is reduced at a constant reduction rate smaller than that in the period from time t1 to time t2, and accordingly, the braking force is also gradually reduced at a constant rate. In addition, the creep driving force corresponding to the torque of the engine 10 is also reduced, and gradually approaches to a constant value corresponding to the idling state.

At time t3, the creep driving force corresponding to the torque of the engine 10 is converged to a substantially constant value corresponding to the idling state of the engine 10, and after time t3, is kept at the substantially constant value corresponding to the idling state with the elapse of time. In addition, at time t3, the braking force becomes the second predetermined braking force BF2 substantially equal to the creep driving force corresponding to the torque of the engine 10. Thus, from time t3, the vehicle gradually starts to travel.

From time t3 to time t4, the brake pressure continues decreasing at the same reduction rate as that in the period from time t2 to time t3, and accordingly, the braking force is gradually reduced at the constant rate. Then, at time t4, the braking force (the brake pressure) becomes zero, and the pressure reducing operation on the brake pressure (the wheel cylinder pressure) performed by the brake ECU 40 is completed.

In this way, from time t1 to time t3, the stopped state of the vehicle is kept, and after time t3, the brake pressure is reduced in such a pressure reduction pattern that the vehicle gradually starts to travel, thereby the vehicle is prevented from rushing out at the start-up of the engine 10. In particular, at the start-up of the engine 10, the torque of the engine 10 overshoots to a maximum torque larger than the torque in the idling state and then is converged to the torque in the idling state. Therefore, if the braking force is made smaller than the creep driving force corresponding to the torque of the engine 10 at a time before the torque of the engine 10 is converged to the torque in the idling state, there is a possibility that the vehicle is sharply rushed out due to the overshoot of the torque of the engine 10. However, by making the braking force larger than the creep driving force corresponding to the torque of the engine 10 at time t2 at which the engine 10 generates the maximum torque, the vehicle can be prevented from rushing out due to the overshoot of the torque of the engine 10. In addition, at the start-up of the engine 10, even though a creep driving is not started immediately after the operation on the brake is released, a discomfort will less likely be given to the driver if the creep driving is performed after the start-up of the engine 10 is completed, that is, the engine 10 has been stabilized at the idling state.

There is a situation in which the engine ECU 20 cannot stop the engine 10 immediately even if the engine stop condition is satisfied and the engine stop request has been output from the idling stop ECU 30. It may be, for example, a situation where the fuel vapor accumulated in the canister needs to be removed, a situation where the position of the cam in the stopped state of the engine has been designated in the case where the engine 10 has a variable valve timing (VVT) mechanism, and so on. That is, it is a situation in a state where a preparation for stopping the engine 10 is needed. Thus, the situation in which the engine 10 will not be stopped even if the engine stop request has been output is referred to as stop preparation state.

In addition, there may be such a situation as follows: the engine start condition is satisfied again when the engine 10 is in the stop preparation state. For example, it can be contemplated the following situation, that is, the vehicle is temporarily stopped on the road, and since the parking time is very short, after the engine 10 becomes the stop preparation state, the engine start condition is satisfied again during the stop preparation state, and the engine start request is output. In this case, the engine 10 will be resumed to a normal rotation state (the idling state) from the stop preparation state. Hereinafter, the situation in which the engine start request is output when the engine 10 is in the stop preparation state (a state of being rotating) is sometimes referred to as COM (Change Of Mind).

Here, in the case where the engine 10 is resumed to the normal rotation state from the stop preparation state, the engine 10 is not stopped, so the driver may anticipate that the creep driving force will be generated together with the releasing of the press on the brake just as normal. However, in the case where the pressure reduction control of the brake pressure as described in FIG. 2 is performed together with the engine start request, a discomfort will be given to the driver. That is, although the driver has released the press on the brake, the vehicle is still in the stopped state from time t1 to time t3 in FIG. 2, so the driver may feel such a discomfort as if a creep traveling cannot be performed.

Therefore, in the present embodiment, when the engine start request is output, for the case where the engine 10 is started from the stopped state and for the case where the engine is resumed to the normal rotation state from the stop preparation state, the method for reducing the brake pressure may be varied. More specifically, the time required for reducing the brake pressure to a predetermined pressure in the case where the engine 10 is resumed from the stop preparation state may be made shorter than the time required for reducing the brake pressure to a predetermined pressure in the case that the engine 10 is started from the stopped state.

Hereinafter, the method for reducing the brake pressure performed by the vehicular control apparatus 1 according to the present embodiment will be described.

Figure 3A:
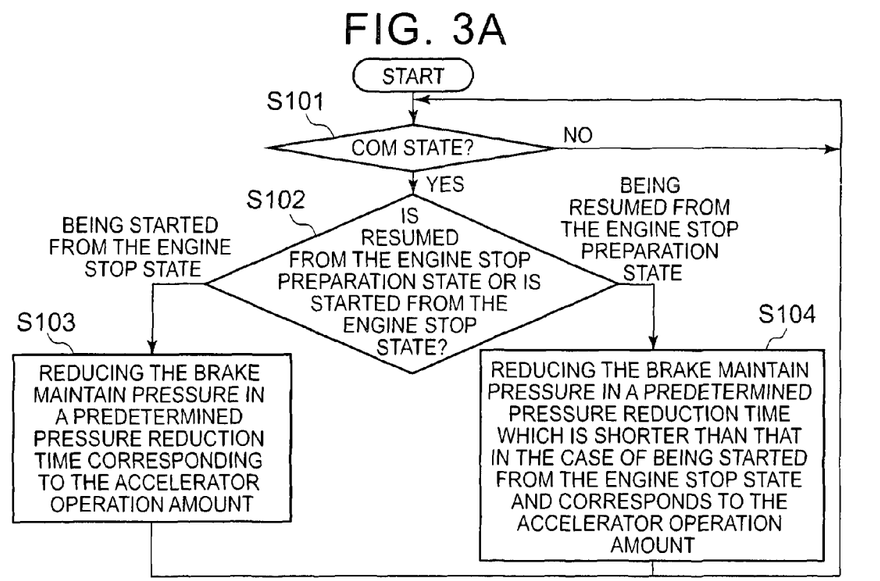
FIG. 3A, 3B are flowcharts showing the operation of the vehicular control apparatus (an idling stop ECU).
Figure 3B:
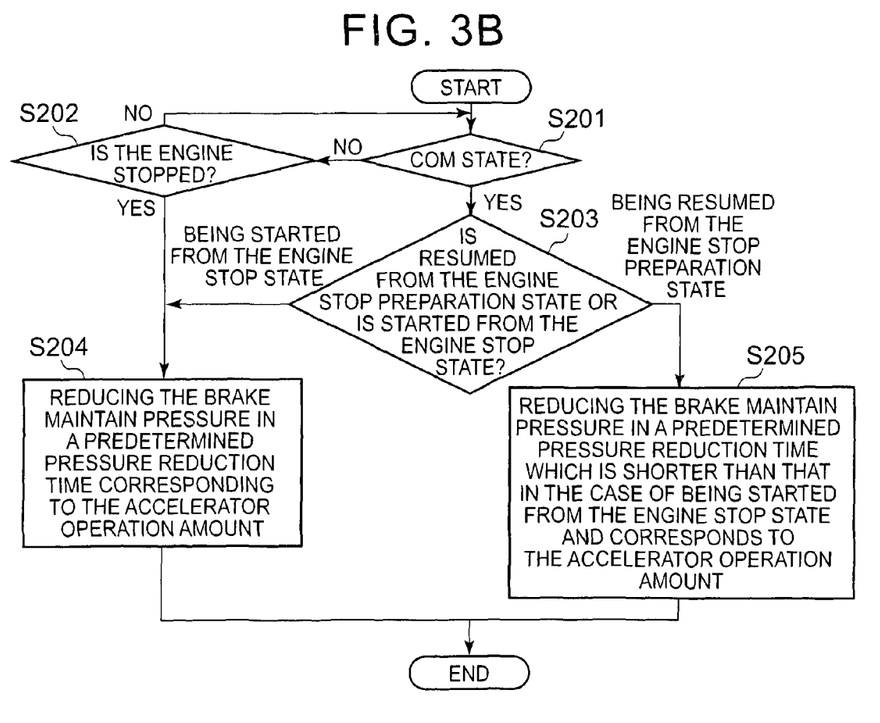

FIG. 3A, 3B are flowcharts showing the operation of the vehicular control apparatus 1 according to the present embodiment. More specifically, it is a flowchart showing that the method for reducing the brake pressure is varied in the case where the engine 10 is resumed from the stop preparation state. FIG. 3A is a flowchart showing the situation in which the occurrence of the COM state is always monitored in a period from a time at which the ignition switch of the vehicle is turned ON to a time at which it is turned OFF. The processing in the flowchart may be performed repetitively at a predetermined sampling time (for example, at a time interval at which the information about the condition of the engine 10 is received from the engine ECU 20). FIG. 3B is a flowchart showing the situation in which the occurrence of the COM state is monitored only when the engine stop request has been output from the idling stop ECU 30. Although FIG. 3A and FIG. 3B are both available, the following description will be given focusing on FIG. 3A. In addition, the processing corresponding to the flowchart is performed by the idling stop ECU 30.

In step S101, it is determined whether or not there is a COM state, that is, whether or not the engine 10 is in the stop preparation state and the engine start request is output.

In the case of being not in the COM state, the determination in step S101 is performed until the COM state occurs. In addition, in the case of being in the COM state, the processing proceeds to step S102.

In step S102, it is determined whether the engine 10 is being resumed from the stop preparation state or is being started from the engine stop state. This is because, for example, even for the determination of being in a COM state, if it is determined immediately before the engine 10 is to be stopped, there is a possibility that the engine 10 is stopped and then is started from the stopped state.

In the case where the engine 10 is started from the stopped state, the processing proceeds to step S103, and the brake pressure is reduced in a predetermined time corresponding to the accelerator operation amount. That is, the brake pressure is reduced by the method equivalent to that shown in FIG. 2. However, FIG. 2 only shows the situation in which the accelerator is OFF.

In the case where the engine 10 is resumed from the stop preparation state, the processing proceeds to step S104, and the brake pressure is reduced in a predetermined time which corresponds to the accelerator operation amount and which is equal to or shorter than the time for the case where the engine 10 is started from the stopped state. In particular, in a region in which the accelerator operation amount is small, the brake pressure may be reduced in a predetermined time which is shorter than the time for the case where the engine 10 is started from the stopped state.

Then, the processing returns to step S101, repetitively determining the occurrence of the COM state.

In addition, since the occurrence of the COM state is monitored in the flowchart of FIG. 3A, in the case where the COM state does not occur and the engine 10 is started from the stopped state, the reduction of the brake pressure can be performed by a processing (in which the stop of the engine having the idling stop function is monitored) parallel to the present flowchart. At this time, in the case where the engine 10 is started from the stopped state, the brake pressure can be reduced by using a pressure reduction method equivalent to that in step S103 in the present flowchart.

In addition, as described above, FIG. 3B is a flowchart showing a processing performed whenever the idling stop ECU 30 outputs the engine stop request. The processing is basically the same as that in FIG. 3A except that it is performed whenever the engine stop request is output. However, different from FIG. 3A, it is determined in step S201 whether or not there is a COM state, and it is determined in step S202 whether or not the engine 10 is stopped by the idling stop function. That is, in the present flowchart, all the states (to be resumed from the COM state, to be stopped from the COM state, or a normal engine stop) of the engine 10 at the time when the engine start request is output can be classified.

Here, the method for reducing the brake pressure in steps S103, S104 of FIG. 3A (steps S204, S205 of FIG. 3B) will be described in details.

Figure 4A:
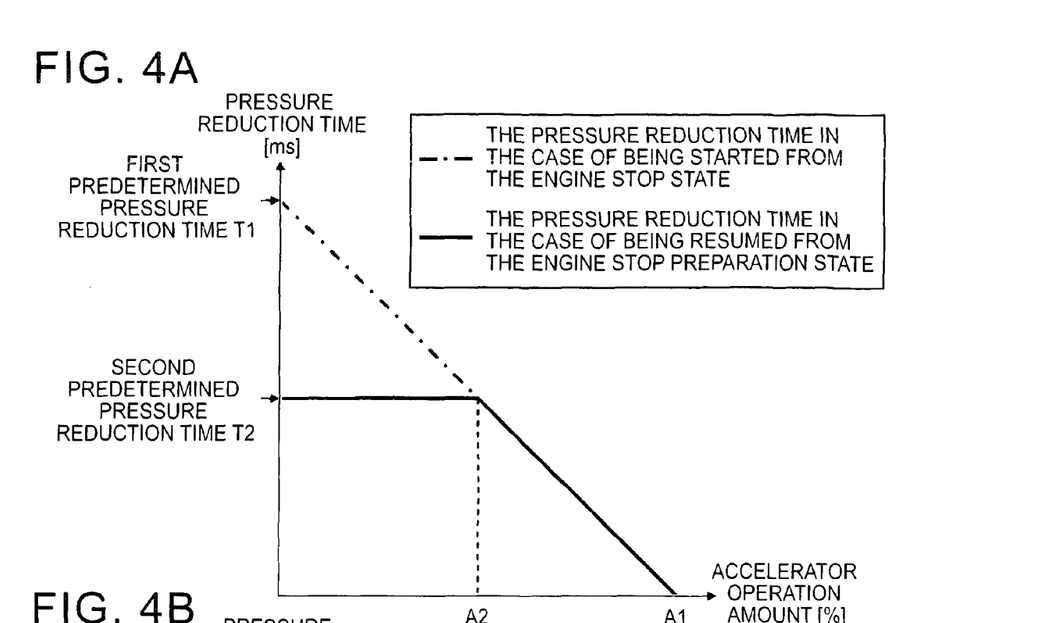
FIG. 4A, 4B are views showing a pressure reduction time of the brake pressure (the time required for reducing the brake pressure to a predetermined pressure) for the case of being started from the engine stop state and for the case of being resumed from an engine stop preparation state.
Figure 4B:
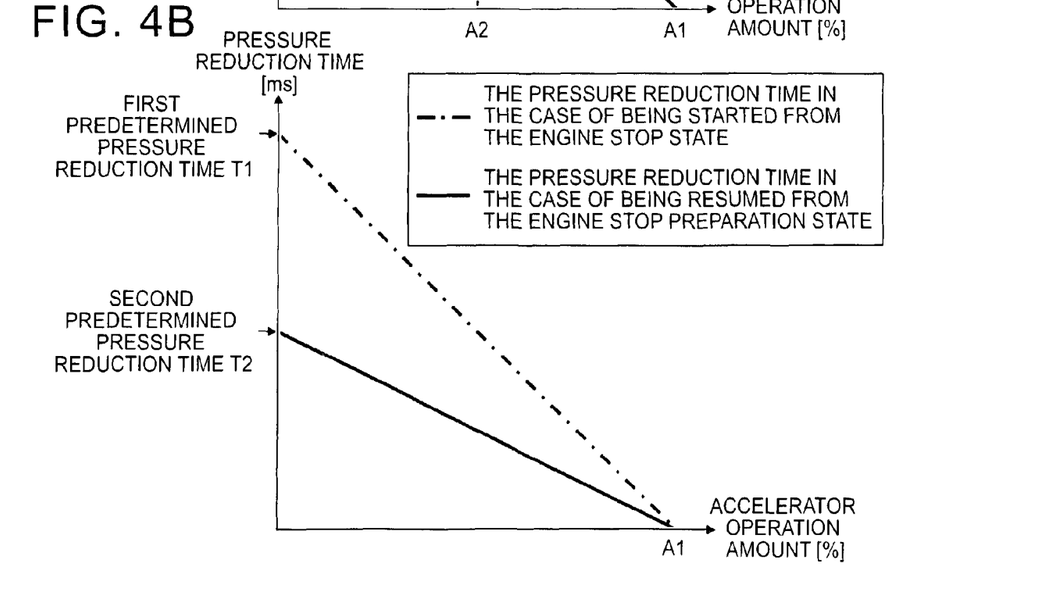

FIG. 4A, 4B are views showing a pressure reduction time of the brake pressure (the time required for reducing the brake pressure to a predetermined pressure) for the case of being started from the engine stop state and for the case of being resumed from the engine stop preparation state. FIG. 4A shows one example of the pressure reduction time of the brake pressure for the case of being started from the engine stop state and for the case of being resumed from the engine stop preparation state, and FIG. 4B shows another example. In FIG. 4A and FIG. 4B, the vertical axis represents the pressure reduction time, the horizontal axis represents the accelerator operation amount, and the relationship between the pressure reduction time and the accelerator operation amount is shown. The dot-dash line represents the case of being started from the engine stop state, and the solid line represents the case of being resumed from the engine stop preparation state. The above-mentioned predetermined pressure may be zero, and may also be a brake pressure corresponding to a driving force that is equal to the driving force (including the creep driving force) generated by driving of the engine 10 (a stable torque related to the corresponding accelerator operation amount), that is, the brake pressure at the time when the vehicle starts to travel.

Referring to FIG. 4A, for the case of being started from the engine stop state, the pressure reduction time when the accelerator is OFF is a first predetermined pressure reduction time T1, and as the accelerator operation amount is increased, the pressure reduction time is decreased linearly, and becomes zero at an accelerator operation amount of A1 (%). Further, for the accelerator operation amount more than it, the pressure reduction time is zero. As described in connection with FIG. 2, at the start-up of the engine 10, the torque of the engine 10 overshoots firstly and then converges to a constant torque. Therefore, in the region where the accelerator operation amount is small, in order to prevent the vehicle from rushing out, a relatively long pressure reduction time is desirable. However, as the accelerator operation amount increases, the stable torque of the engine 10 is increased to exceed the maximum torque upon overshoot. Thus, the influence of the overshoot is gradually reduced. Therefore, the pressure reduction time is linearly decreased with the increase of the accelerator operation amount, and becomes zero when the accelerator operation amount is A1 (%) or more.

In contrast, for the case of being resumed from the engine stop preparation state, the pressure reduction time when the accelerator is OFF is a second predetermined pressure reduction time T2 which is half of the first predetermined pressure reduction time T1, and is kept constant from the accelerator being OFF to the accelerator operation amount becoming an accelerator operation amount A2 (%) which is half of the accelerator operation amount A1 (%). Also, in the region above the accelerator operation amount A2 (%), the pressure reduction time is the same as that for the case of being started from the engine stop state. In the region in which the accelerator operation amount is small, including the accelerator being OFF, as described above, the pressure reduction time may be set shorter than that for the case of being started from the engine stop state, such that the driver will not feel a discomfort as if the creep driving force disappears. Thereby, it is possible to travel by using the creep driving force at an earlier time, and it is possible to alleviate the discomfort given to the driver. In addition, as described above, as the accelerator operation amount becomes larger, the influence caused by the overshoot at the start-up of the engine is reduced, and the pressure reduction time for the case of being started from the engine stop state becomes sufficiently short. Therefore, for the case of being resumed from the engine stop preparation state, the pressure reduction time may be equivalently set.

In addition, as shown in FIG. 4B, the pressure reduction time for the case of being resumed from the engine stop preparation state may also be linearly decreased from the second predetermined pressure reduction time T2, and the pressure reduction time becomes zero at the time when the accelerator operation amount becomes A1 (%). That is, in the region where the accelerator operation amount is smaller than A1 (%), the pressure reduction time for the case of being resumed from the engine stop preparation state may be set to be shorter than the pressure reduction time for the case of being started from the engine stop state (may be set to be half of the latter). At least in the region in which the accelerator operation amount is small, including the accelerator is OFF, it is preferred that the pressure reduction time for the case of being resumed from the engine stop preparation state be set to be shorter than the pressure reduction time for the case of being started from the engine stop state. Thereby, it is possible not only to prevent the vehicle from rushing out in the case of being started from the engine stop state, but also to alleviate the discomfort as if the creep traveling disappears in the case of being resumed from the stop preparation state.

In addition, as the above accelerator operation amount A2, for example, it can be set as such a predetermined ratio that the stable torque of the engine 10 corresponding thereto is equal to or larger than the maximum torque at the start-up of the engine 10. That is, when the accelerator operation amount is the predetermined ratio or more, the influence incurred by the overshoot of torque at the start-up of the engine 10 almost disappears. In other words, when the accelerator operation amount is smaller than the predetermined ratio, the overshoot of torque at the start-up of the engine 10 has some influence, and thus, the pressure reduction time at the start-up of the engine 10 should be extended to some extent. Therefore, in the region in which the accelerator operation amount is smaller than the predetermined ratio, it is preferred that the pressure reduction time for the case where the engine 10 is resumed from the stop preparation state be shorter than for the case where the engine 10 is started from the stopped state.

Next, taking the situation where the accelerator is OFF (is closed to such an extent that the driving force generated by the operation of the accelerator may be neglected) as an example, the brake release (reduction of the brake pressure) operation performed by the brake ECU 40 in the case where the engine 10 is resumed from the stop preparation state will be described in detail. In addition, given that for the case where the engine 10 is started as well as for the case where the engine 10 is resumed from the stop preparation state, the press of the driver on the brake pedal is released, and the MC pressure is reduced to a predetermined release pressure or below.

Figure 5:
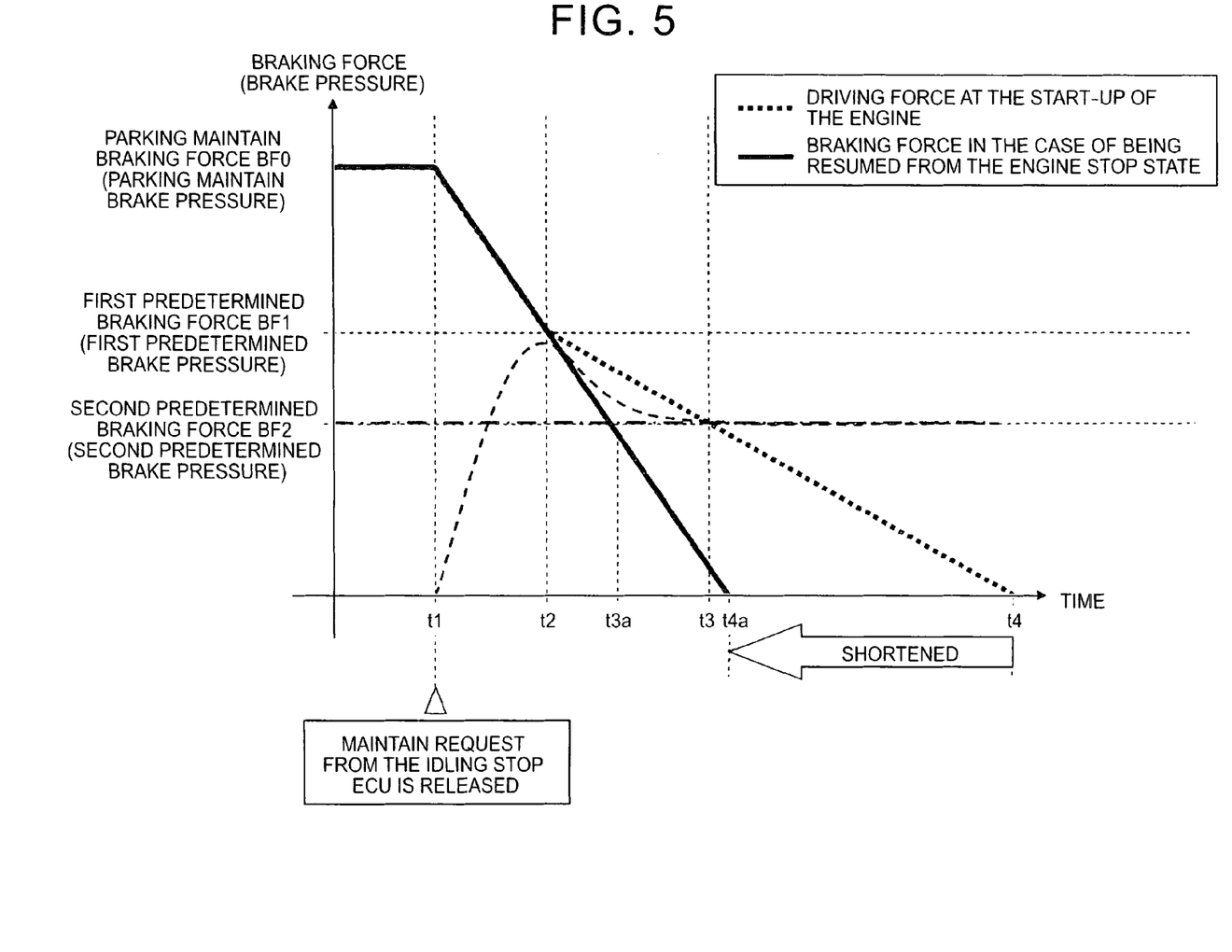
FIG. 5 is a view showing an example of the variation of the brake pressure with time in the case of being resumed from the engine stop preparation state.

FIG. 5 is a view showing an example of the operation of the vehicular control apparatus 1 (the brake ECU 40) in the case where the engine 10 is resumed from the stop preparation state and the accelerator is OFF, corresponding to FIG. 2 in which the engine 10 is started from the engine stop state. The vertical axis represents the braking force (or the brake pressure), the horizontal axis represents time, and the variation with time of the braking force (the brake pressure) before and after the brake release request is output from the idling stop ECU 30 is indicated by a thick solid line. In addition, the creep driving force corresponding to the torque of the engine 10 still in a rotating state (the idling state) is indicated by a thin dot-dash line as well. In addition, for comparison, the variation with time of the braking force (the brake pressure) before and after the brake release request is output from the idling stop ECU 30 for the case where the engine 10 is started from the stopped state and the accelerator is OFF is indicated by a thick dotted line. In addition, the creep driving force corresponding to the torque of the engine 10 at the start-up of the engine 10 is indicated by a thin and long dash line. In addition, in this figure, the parking maintain braking force (the parking maintain brake pressure) BF0, the first predetermined braking force (the first predetermined brake pressure) BF1, and the second predetermined braking force (the second predetermined brake pressure) BF2 are the same as in FIG. 2, and the description thereof is omitted.

In FIG. 5, for the case of being resumed from the engine stop preparation state, the pressure reduction time until the brake pressure becomes zero is shorter than (is half of) the pressure reduction time for the case of being started from the stopped state, as will be further described below.

Until time t1, like in FIG. 2, a constant parking maintain braking force BF0 corresponding to the brake maintain request from the idling stop ECU 30 is generated, thereby the stopped state of the vehicle is kept. In addition, the creep driving force corresponding to the torque of the engine 10 which continues in the idling state is, both before time t1 and after time t1, a constant driving force corresponding to a substantially constant idling torque. Furthermore, in the case where the above peak maintain control is performed, the parking maintain braking force BF0 becomes the maximum braking force generated by the operation of the driver, and thus is a value variable from time to time; however, for the sake of comparison, it is set as a same value both for the case where the engine 10 is resumed from the stop preparation state and for the case where the engine 10 is started from the stopped state.

At time t1, the idling stop ECU 30 outputs the engine start request to the engine ECU 20, and outputs the brake release request to the brake ECU 40. Consequently, from time t1, the brake pressure is reduced at a constant pressure reducing rate, and the braking force is also gradually reduced at a constant rate accordingly.

At time t3a, the braking force becomes the second predetermined braking force BF2 which is substantially equal to the creep driving force corresponding to the torque of the engine 10 which continues in the idling state. Thus, after time t3a, the vehicle slowly starts to travel. Then, at time t4a, the braking force (the brake pressure) becomes zero, and the pressure reducing operation on the brake pressure (wheel cylinder pressure) performed by the brake ECU 40 is completed.

In contrast, for the braking force in the case where the engine 10 is started from the stopped state as an comparison object, from time t1 to time t2, the brake pressure is reduced at a pressure reducing rate which is the same as that for the case where the engine 10 is resumed from the stop preparation state, and the braking force is also reduced at a constant rate corresponding thereto.

However, in the case where the engine 10 is started, it takes time for the torque of the engine 10 to converge to a stable idling state. Therefore, after time t2, the pressure reducing rate of the brake pressure is slowed down, and at time t3 at which the torque of the engine 10 becomes stable, the braking force is brought to be substantially equal to the creep driving force corresponding to the torque of the engine 10, so as to prevent the vehicle from rushing out. Then, from time t3 to time t4, the brake pressure continues decreasing at the slowed-down pressure reducing rate which is the same as that in a period from time t2 to time t3, and at time t4, the braking force (the brake pressure) becomes zero, and the pressure reducing operation on the brake pressure (the wheel cylinder pressure) performed by the brake ECU 40 is completed.

In this way, in the case where the engine 10 is started from the stopped state, after time t2, the pressure reducing rate is slowed down in order to prevent rushing out. In contrast, in the case where the engine 10 is resumed from the stop preparation state, since the engine 10 is continuously stable in the idling state, it is possible to reduce the brake pressure from time t1 up to zero at a relative large constant pressure reducing rate. Thereby, the time required for reducing the brake pressure to zero is shortened. Furthermore, as described above, compared with FIG. 4A, 4B, the time until the brake pressure becoming zero is half of the time in the case where the engine 10 is started from the stopped state.

In addition, meanwhile, for the time until the braking force becomes the second predetermined braking force BF2 which is substantially equal to the creep driving force corresponding to the torque of the engine 10, that is, the time until the vehicle starts to travel, it can also be shorter than that in the case where the engine 10 is started from the stopped state. That is, the time at which the braking force becomes equal to the creep driving force corresponding to the torque of the engine 10 is advanced from time t3 to time t3a which is earlier than time t3. Therefore, compared with the case where the engine 10 is started from the stopped state, in the case where the engine 10 is resumed from the stop preparation state, it is possible to shorten the time until the vehicle starts to travel, and it is possible to alleviate the discomfort given to the driver.

In addition, while in FIG. 5, the pressure reducing rate is set to make the pressure reduction time until the brake pressure becomes zero be shorter than the pressure reduction time in the case where the engine is started from the stopped state, the pressure reducing rate may also be set to make the pressure reduction time until the vehicle starts to travel be shorter than the pressure reduction time in the case where the engine is started from the stopped state. That is, since it is believed that the driver will feel less discomfort if the vehicle early starts to travel, the pressure reducing rate may also be set to directly shorten the pressure reduction time until the vehicle starts to travel.

Figure 6:
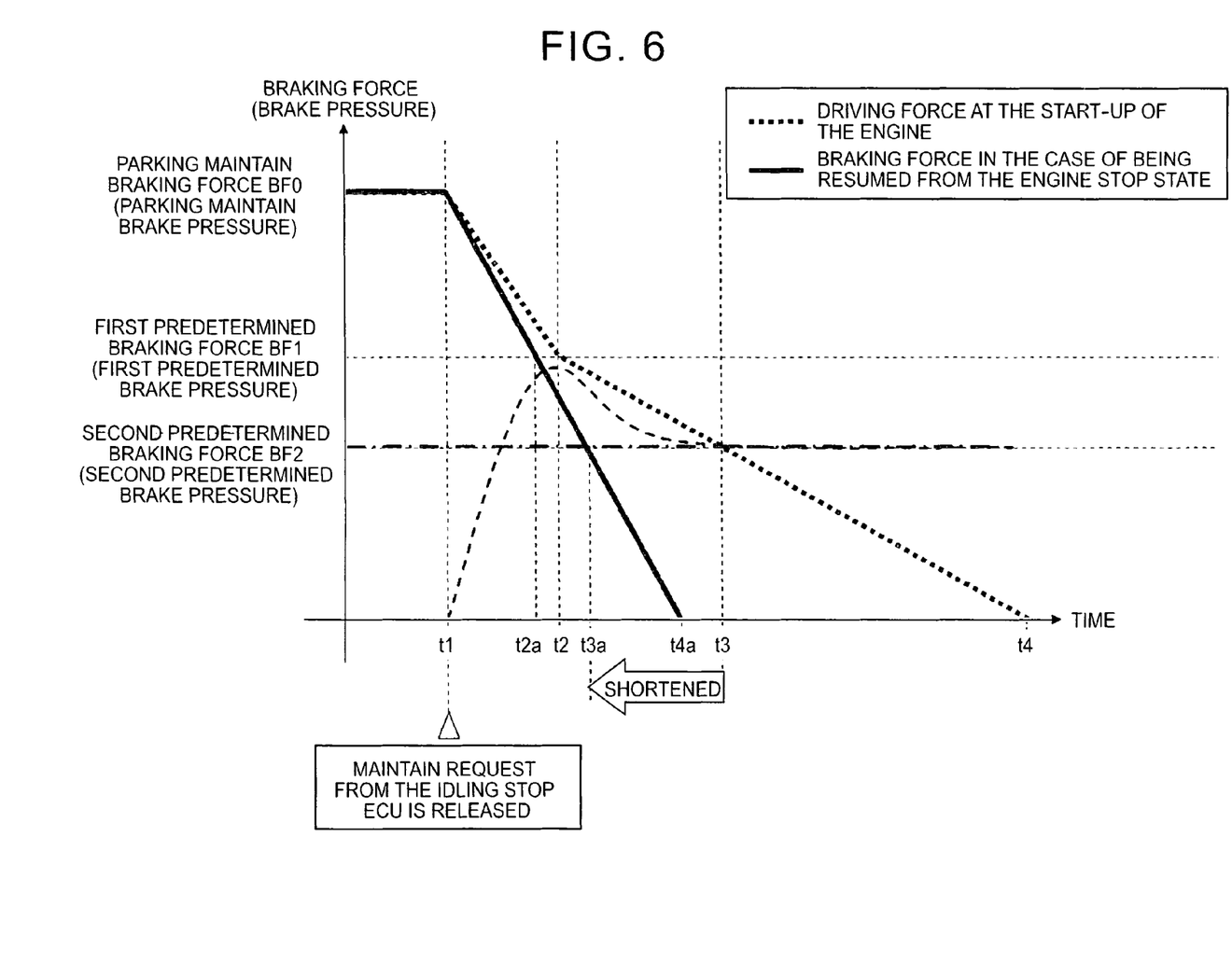
FIG. 6 is a view showing another example of the variation of the brake pressure with time in the case of being resumed from the engine stop preparation state.

FIG. 6 is a view showing the operation of the vehicular control apparatus 1 (the brake ECU 40) in the case where the engine 10 is resumed from the stop preparation state and the accelerator is OFF. Like FIG. 5, it corresponds to FIG. 2 in which the case where the engine 10 is started from the stopped state is shown. The vertical axis represents the braking force (the brake pressure), the horizontal axis represents time, and the variation with time of the braking force (the brake pressure) before and after the brake release request is output from the idling stop ECU 30 is indicated by a thick solid line. In addition, the creep driving force corresponding to the torque of the engine 10 which continues in a rotating state (the idling state) is indicated by a dot-dash line as well. In addition, for comparison, the variation with time of the braking force (the brake pressure) before and after the brake release request is output from the idling stop ECU 30 in the case where the engine 10 is started from the stopped state and the accelerator is OFF is indicated by a thick dotted line. In addition, the creep driving force corresponding to the torque of the engine 10 at the start-up of the engine 10 is indicated by a thin and long dash line. In addition, in this figure, the parking maintain braking force (the parking maintain brake pressure) BF0, the first predetermined braking force (the first predetermined brake pressure) BF1, and the second predetermined braking force (the second predetermined brake pressure) BF2 are the same as in FIG. 2 and FIG. 5, and the description thereof is omitted.

In FIG. 6, the pressure reduction time until the braking force becomes substantially equal to the creep driving force corresponding to the torque of the engine 10 in the idling state for the case of being resumed from the engine stop preparation state is shorter than (is half of) the pressure reduction time for the case of being started from the stopped state, as will be further described below.

Until time t1, like in FIG. 2 and FIG. 5, a constant parking maintain braking force BF0 corresponding to the brake maintain request from the idling stop ECU 30 is generated, thereby the stopped state of the vehicle is kept. In addition, the creep driving force corresponding to the torque of the engine 10 which continues in the idling state is, both before time t1 and after time t1, a constant driving force corresponding to a substantial constant idling torque. Furthermore, in the case where the above peak maintain control is performed, the parking maintain braking force BF0 becomes the maximum braking force generated by the operation of the driver, and thus, is a value variable from time to time; however, for the sake of comparison, it is set as a same value both for the case where the engine 10 is resumed from the stop preparation state and for the case of being started from the stopped state.

At time t1, the idling stop ECU 30 outputs the engine start request to the engine ECU 20, and outputs the brake release request to the brake ECU 40. Consequently, from time t1, the brake pressure is reduced at a relative large constant pressure reducing rate, and the braking force is also gradually reduced at a constant rate accordingly.

At time t3a, the braking force becomes substantially equal to the creep driving force corresponding to the torque of the engine 10 which continues in the idling state. Thus, after time t3a, the vehicle slowly starts to travel. Then, at time t4a, the braking force (the brake pressure) becomes zero, and the pressure reducing operation on the brake pressure (wheel cylinder pressure) performed by the brake ECU 40 is completed.

In contrast, in the case where the engine 10 is started from the stopped state as a comparison object, the braking force should be the first predetermined braking force BF1 which is larger than the maximum value upon overshoot of the creep driving force corresponding to the torque of the engine 10 at time t2, in order to prevent rushing out. Therefore, the pressure reducing rate of the brake pressure is limited, and is smaller than the pressure reducing rate of the brake pressure in the case where the engine 10 is resumed from the stop preparation state.

In addition, as described above, in the case where the engine 10 is started, it takes time for the torque of the engine 10 to be converged to a stable idling state. Therefore, after time t2, the pressure reducing rate of the brake pressure is slowed down, and at time t3 at which the torque of the engine 10 becomes stable, the braking force is brought to be substantially equal to the creep driving force corresponding to the torque of the engine 10, so as to prevent the vehicle from rushing out. Then, from time t3 to time t4, the brake pressure is continuously reduced at the slowed-down pressure reducing rate which is the same as that in a period from time t2 to time t3, and at time t4, the braking force (the brake pressure) becomes zero, and the pressure reducing operation on the brake pressure (wheel cylinder pressure) performed by the brake ECU 40 is completed.

In this way, in the case where the engine 10 is started from the stopped state, in order to prevent the vehicle from rushing out, the pressure reducing rate of the brake pressure is limited in a period from time t1 to time t2. In addition, after time t2, the pressure reducing rate is slowed down in order to prevent rushing out. In contrast, in the case where the engine 10 is resumed from the stop preparation state, since the engine 10 is continuously stable in the idling state, it is possible to reduce the brake pressure from time t1 at a relative large constant pressure reducing rate. Thereby, the time required for reducing the brake pressure such that the braking force becomes substantially equal to the creep driving force corresponding to the torque of the engine 10 in the idling state (the second predetermined braking force BF2) is shortened. Therefore, compared with the case where the engine 10 is started from the stopped state, in the case where the engine 10 is resumed from the stop preparation state, it is possible to shorten the time until the vehicle starts to travel, and it is possible to alleviate the discomfort given to the driver. Furthermore, as described above, compared with FIG. 4A, 4B, the pressure reduction time until the braking force corresponding to the brake pressure becomes substantially equal to the creep driving force corresponding to the torque of the engine 10 in the idling state is a half of the pressure reduction time in the case where the engine 10 is started from the stopped state.

In addition, in the case where the engine 10 is started from the stopped state, corresponding to the overshoot of the torque of the engine 10, the pressure reducing rate in a period from time t1 to time t2 is limited, while in the case where the engine 10 is resumed from the stop preparation state, there is no such a limitation. Therefore, the period from time t1 at which the brake release request is output to the time at which the braking force becomes the first predetermined braking force BF1 can be freely set. That is, the time at which the braking force becomes the first predetermined braking force BF1 can be advanced from time t2 to time t2a which is earlier than time t2. Therefore, the pressure reducing rate of the brake pressure can be further increased from time t1 in order to perform pressure reduction, and the pressure reducing rate from time t1 to the time at which the brake pressure becomes zero can also be freely changed. Thereby, the vehicle can perform the creep traveling as soon as possible, while considering the driving comfort and so on. For example, the braking force can be reduced sharply to the second predetermined braking force BF2 from time t1 in order to start the creep traveling as soon as possible, and then the pressure reducing rate is slowed down to suppress rushing out, and so on.

In addition, in above FIG. 5 and FIG. 6, the brake release (reduction of the brake pressure) operation performed by the brake ECU 40 in the case where the engine 10 is resumed from the stop preparation state has been described by taking the situation where the accelerator is OFF as an example; however, the same operation may also be performed in case of a certain accelerator operation amount for which the overshoot of the torque at the start-up of the engine 10 has some influence. For example, in a region below a ratio of accelerator operation amount at which the corresponding stable torque of the engine 10 becomes equal to the maximum torque at the start-up of the engine 10, the brake release operation of the brake ECU 40 like that in FIG. 5 and FIG. 6 can also be performed, and can achieve the same function and effect. That is, in the case that the engine 10 is started from the stopped state, the brake pressure is reduced so that at a time when the torque becomes the maximum value at the start-up of the engine, a braking force larger than the driving force corresponding to this maximum value is maintained, and after the torque of the engine 10 is stable, the braking force becomes a braking force which allows the vehicle to travel. In addition, in the case that the engine 10 is resumed from the stop preparation state, the rotation of the engine 10 is stabilized at a stable torque corresponding to the accelerator operation amount, therefore, the brake pressure is reduced to a predetermined pressure (e.g., the brake pressure at which the vehicle starts to travel) in a period shorter than that for the case where the engine 10 is started from the stopped state. Thereby, it is possible not only to prevent the vehicle from rushing out in the case where the engine 10 is started from the stopped state, but also to alleviate the discomfort as if the creep traveling disappears in the case where the engine 10 is resumed from the stop preparation state.

While the embodiments of the present invention have been described in detail above, the present invention is not limited to these embodiments, and various variation and modification can be made within the scope of the spirit of the present invention as defined by the attached claims.

What is claimed is:

1. A control apparatus for a vehicle, comprising:
   an engine controlling part that stops an engine by outputting a stop request to the engine if a predetermined engine stop condition is satisfied, and that starts the stopped engine or resumes the engine which is performing a stop preparation and is still rotating to a normal rotation state, by outputting a start request to the engine if a predetermined engine start condition is satisfied after the stop request has been output;
   a brake controlling part that, at least in a period from the output of the stop request to the output of the start request by the engine controlling part, automatically generates a braking force for keeping parking of the vehicle, regardless of a driver's brake operation, and that in a case where an accelerator operation amount is smaller than a predetermined ratio, when the start request has been output and the engine is being resumed to the normal rotation state from a state in which the stop preparation is being performed, reduces a brake pressure to a first predetermined pressure in a shorter time than that when the start request has been output and the engine is being started from a stopped state; and
   a creep driving force generating part that generates a creep driving force by driving of the engine.

2. The control apparatus for a vehicle according to claim 1, wherein
   the first predetermined pressure is a brake pressure corresponding to a braking force which is substantially equal to a driving force generated by the engine according to the accelerator operation amount.

3. The control apparatus for a vehicle according to claim 1, wherein
   when the start request has been output and the engine is being started from the stopped state in the case where the accelerator operation amount is smaller than the predetermined ratio, the brake controlling part reduces the brake pressure to a second predetermined pressure in a first predetermined time corresponding to the time from the output of the start request to the occurrence of a maximum torque at a start-up of the engine, the second predetermined pressure being a pressure for generating a predetermined braking force which is larger than the creep driving force corresponding to the maximum torque.

4. The control apparatus for a vehicle according to claim 3, wherein
   the brake controlling part reduces the brake pressure to the second predetermined pressure in a second predetermined time which is shorter than the first predetermined time, when the start request has been output and the engine is being resumed from the state in which the stop preparation is being performed to the normal rotation state in the case where the accelerator operation amount is smaller than the predetermined ratio.

5. The control apparatus for a vehicle according to claim 1, wherein
   the predetermined ratio is a ratio of the accelerator operation amount at which a stable torque of the engine becomes a maximum torque at a start-up of the engine or more.

* * * * *